United States Patent
Sarrigeorgidis

(10) Patent No.: US 7,616,695 B1
(45) Date of Patent: Nov. 10, 2009

(54) MIMO EQUALIZER DESIGN: AN ALGORITHMIC PERSPECTIVE

(75) Inventor: Konstantinos Sarrigeorgidis, Oakland, CA (US)

(73) Assignee: Marvell International Ltd., Hamilton (BM)

( * ) Notice: Subject to any disclaimer, the term of this patent is extended or adjusted under 35 U.S.C. 154(b) by 745 days.

(21) Appl. No.: 10/944,144

(22) Filed: Sep. 16, 2004

Related U.S. Application Data

(60) Provisional application No. 60/581,041, filed on Jun. 17, 2004.

(51) Int. Cl.
*H04K 1/10* (2006.01)
(52) U.S. Cl. .......................... 375/260; 375/267; 375/343
(58) Field of Classification Search ................. 375/260, 375/343, 267, 360; 342/378; 705/1
See application file for complete search history.

(56) References Cited

U.S. PATENT DOCUMENTS

| | | | |
|---|---|---|---|
| 5,630,154 | A | 5/1997 | Bolstad et al. |
| 5,852,630 | A | 12/1998 | Langberg et al. |
| 6,600,796 | B1 * | 7/2003 | Hassibi ........................ 375/347 |
| 6,760,374 | B1 | 7/2004 | Tapp et al. |
| 2002/0021770 | A1 | 2/2002 | Beerel et al. |
| 2003/0003863 | A1 | 1/2003 | Thielecke et al. |
| 2003/0020651 | A1 * | 1/2003 | Crilly et al. .................. 342/378 |
| 2004/0165684 | A1 * | 8/2004 | Ketchum et al. ............. 375/343 |
| 2004/0181419 | A1 * | 9/2004 | Davis et al. ..................... 705/1 |
| 2004/0192218 | A1 | 9/2004 | Oprea |
| 2005/0040822 | A1 | 2/2005 | Heaton |
| 2005/0084028 | A1 | 4/2005 | Yu et al. |
| 2005/0141624 | A1 * | 6/2005 | Lakshmipathi et al. ...... 375/260 |
| 2005/0245197 | A1 | 11/2005 | Kadous et al. |
| 2005/0249302 | A1 * | 11/2005 | Leshem et al. .............. 375/267 |
| 2005/0249303 | A1 | 11/2005 | Takano |
| 2005/0276347 | A1 | 12/2005 | Mujtaba et al. |
| 2006/0072692 | A1 | 4/2006 | Gifford et al. |
| 2006/0074290 | A1 | 4/2006 | Chen et al. |
| 2006/0182206 | A1 | 8/2006 | Coon et al. |
| 2006/0227893 | A1 | 10/2006 | Bar-Ness et al. |
| 2007/0253476 | A1 | 11/2007 | Tirkkonen et al. |
| 2007/0258538 | A1 | 11/2007 | Wight |
| 2008/0108310 | A1 | 5/2008 | Tong et al. |
| 2008/0170533 | A1 | 7/2008 | Cyzs et al. |
| 2008/0285670 | A1 | 11/2008 | Walton et al. |
| 2008/0317141 | A1 | 12/2008 | Burg et al. |

OTHER PUBLICATIONS

Strang, Gilbert "Linear Algebra and its Applications" 1976, 1980, Academic Press, Inc. Second Edition, New York, pp. 128-132.*
"Part 16: Air Interface for Fixed Broadband Wireless Access Systems", IEEE Standard 802.16 (Oct. 2004); pp. 1-857.
Draft 802.20 Permanent Document; "System Requirements for IEEE 802.20 Mobile Broadband Wireless Access Systems —Version 14"; IEEE p. 802.20 PD-06; Jul. 16, 2004.
U.S. Appl. No. 11/222,490, filed Sep. 7, 2005, Sarrigeorgidis.

(Continued)

*Primary Examiner*—Shuwang Liu
*Assistant Examiner*—Kabir A Timory

(57) ABSTRACT

A receiver in a MIMO-OFDM system may estimate the transmitted signal by performing a QR decomposition on the channel response matrix. The receiver may utilize Givens rotations to perform the decomposition, which may be performed using coordinate rotation digital computer (CORDIC) modules.

35 Claims, 7 Drawing Sheets

OTHER PUBLICATIONS

U.S. Appl. No. 11/316,522, filed Dec. 21, 2005, Sarrigeorgidis.

"Information technology—Telecommunications and information exchange between systems—Local and metropolitan area networks—Specific requirements- Part 11: Wireless LAN Medium Access Control (MAC) and Physical Layer (PHY) specifications", ANSI/IEEE Std 802.11, 1999.

"Part 11: Wireless LAN Medium Access Control (MAC) and Physical Layer (PHY) specifications: Higher-Speed Physical Layer Extension in the 5 GHz Band", IEEE Std 802.11a-1999.

"Part 11: Wireless LAN Medium Access Control (MAC) and Physical Layer (PHY) specifications: Higher-Speed Physical Layer Extension in the 2.4 GHz Band", IEEE Std 802.11b-1999.

"Draft Supplement to Standard [for] Information Technology—Telecommunications and information exchange between systems—Local and metropolitan area networks-Specific requirements—Part 11: Wireless LAN Medium Access Control (MAC) and Physical Layer (PHY) specifications: Further Higher Data Rate Extension in the 2.4 GHz Band", IEEE 802.11g/D8.2, Apr. 2003.

"TGn Sync Proposal Technical Specification", IEEE 802.11n-04/0889r6, May 2005.

Golub et al., *Matrix Computations*, The Johns Hopkins University Press, 3d Ed., 1996, Chapter 5, pp. 206-274.

Gesbert, et al., "From Theory to Practice: An Overview of MIMO Space-Time Coded Wireless Systems," *IEEE Journal on Selected Areas in Communications*, vol. 21, No. 3, Apr. 2003.

Golub et al., "Matrix Computations", The John Hopkins University Press, $3^{rd}$ Edition, 1996, Ch. 5.

* cited by examiner $$R^{-1}_{4\times4} = \begin{bmatrix} \dfrac{1}{r_{11}} & \dfrac{-r_{12}}{r_{11}r_{22}} & \dfrac{r_{12}r_{23} - r_{13}r_{22}}{r_{11}r_{22}r_{33}} & \dfrac{r_{12}r_{24}r_{33} - r_{14}r_{22}r_{33} + r_{13}r_{22}r_{34} - r_{12}r_{23}r_{34}}{r_{11}r_{22}r_{33}r_{44}} \\ & \dfrac{1}{r_{22}} & \dfrac{-r_{23}}{r_{22}r_{33}} & \dfrac{r_{23}r_{34} - r_{24}r_{33}}{r_{22}r_{33}r_{44}} \\ & & \dfrac{1}{r_{33}} & \dfrac{-r_{34}}{r_{33}r_{44}} \\ & & & \dfrac{1}{r_{44}} \end{bmatrix}$$

$R^{-1}_{2\times2}$ $R^{-1}_{3\times3}$

FIG. 5

$$\begin{bmatrix} x & x & x \\ x & x & x \\ x & x & x \end{bmatrix} \rightarrow \begin{bmatrix} x & 0 & x \\ x & x & x \\ x & x & x \end{bmatrix} \rightarrow \begin{bmatrix} x & x & x \\ 0 & x & x \\ 0 & x & x \end{bmatrix} \rightarrow \begin{bmatrix} x & x & x \\ 0 & x & x \\ 0 & 0 & x \end{bmatrix} \rightarrow \begin{bmatrix} x & x & x \\ 0 & x & x \\ 0 & 0 & 0 \end{bmatrix} = \begin{bmatrix} |x| & |x| & |x|e^{j\phi} \\ 0 & |x| & |x| \\ 0 & 0 & 0 \end{bmatrix}$$

FIG. 8A $$\begin{bmatrix} e^{-j\phi} & 0 \\ 0 & 1 \end{bmatrix} \begin{bmatrix} |x| & |x|e^{j\phi} \\ |x| & |x| \end{bmatrix} \begin{bmatrix} e^{j\phi} & 0 \\ 0 & 1 \end{bmatrix} = \begin{bmatrix} |x| & |x| \\ |x| & |x| \end{bmatrix} = A$$

FIG. 8B $$\begin{bmatrix} x & x \\ 0 & x \end{bmatrix} \rightarrow \begin{bmatrix} x & 0 \\ \sigma & x \end{bmatrix} \rightarrow \begin{bmatrix} x & \sigma \\ 0 & x \end{bmatrix} \rightarrow \begin{bmatrix} x & 0 \\ \sigma & x \end{bmatrix} \rightarrow \begin{bmatrix} x & \varepsilon \\ 0 & x \end{bmatrix} \approx \begin{bmatrix} x & 0 \\ 0 & x \end{bmatrix}$$

MIMO EQUALIZER DESIGN: AN ALGORITHMIC PERSPECTIVE

CROSS-REFERENCE TO RELATED APPLICATIONS

This application claims priority to U.S. Provisional Application Ser. No. 60/581,041, filed on Jun. 17, 2004.

BACKGROUND

Wireless phones, laptops, PDAs, base stations and other systems may wirelessly transmit and receive data. A single-in-single-out (SISO) system may have two single-antenna transceivers in which one predominantly transmits and the other predominantly receives. The transceivers may use multiple data rates depending on channel quality.

An $M_R \times M_T$ multiple-in-multiple-out (MIMO) wireless system uses multiple transmit antennas ($M_T$) and multiple receive antennas ($M_R$) to improve data rates and link quality. The MIMO system may achieve high data rates by using a transmission signaling scheme called "spatial multiplexing," where a data bit stream is demultiplexed into parallel independent data streams. The independent data streams are sent on different transmit antennas to obtain an increase in data rate according to the number of transmit antennas used. Alternatively, the MIMO system may improve link quality by using a transmission signaling scheme called "transmit diversity," where the same data stream (i.e., same signal) is sent on multiple transmit antennas after appropriate coding. The receiver receives multiple copies of the coded signal and processes the copies to obtain an estimate of the received data.

The number of independent data streams transmitted is referred to as the "multiplexing order" or spatial multiplexing rate ($r_S$). A spatial multiplexing rate of $r_S=1$ indicates pure diversity and a spatial multiplexing rate of $r_S=\min(M_R, M_T)$ (minimum number of receive or transmit antennas) indicates pure multiplexing.

SUMMARY

A receiver in a wireless system, e.g., a MIMO-OFDM system, may estimate the transmitted signals by estimating a channel response matrix from the received signals and performing a QR decomposition on the channel response matrix. The receiver may utilize Givens rotations to perform the decomposition, which may be performed using coordinate rotation digital computer (CORDIC) modules (e.g., "Super-CORDIC" modules). The results of the QR decomposition may be stored in a memory. A decoder may used the stored results of the decomposition and the received signals to estimate the transmitted signals.

The results of the QR decomposition may include a number of angles encoding a Q matrix and an inverse of an R matrix. The receiver may use the inverse of the R matrix to calculate a signal-to-noise ratio (SNR) of the received signals.

In an embodiment, the Super-CORDIC modules may also be used to perform a singular value decomposition (SVD).

BRIEF DESCRIPTION OF THE DRAWINGS

FIG. 5 shows an inverse of upper diagonal matrix R.

FIG. 7 is a flowchart describing an SVD-CORDIC operation.

FIGS. 8A-C illustrate steps in an SVD operation.

DETAILED DESCRIPTION

Figure 1:
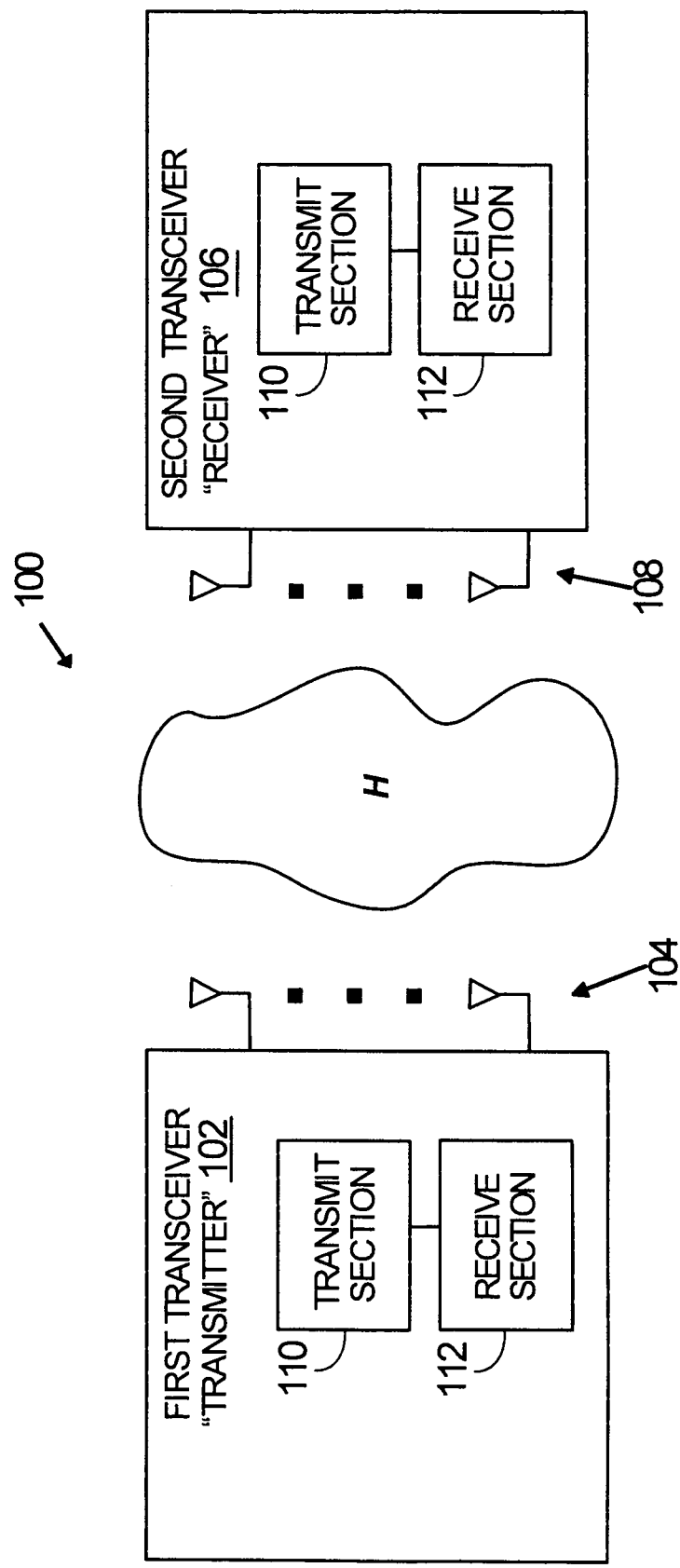
FIG. 1 is a block diagram of a wireless multiple-in-multiple-out (MIMO)-orthogonal frequency-division multiplexing (OFDM) communication system according to an embodiment.

FIG. 1 illustrates a wireless multiple-in-multiple-out (MIMO) communication system 100, which includes a first transceiver 102 with $M_T$ transmit ($T_X$) antennas 104 and a second transceiver 106 with $M_R$ receive ($R_X$) antennas 108, forming an $M_R \times M_T$ MIMO system. For the description below, the first transceiver 102 is designated as a "transmitter" because the transceiver 102 predominantly transmits signals to the transceiver 106, which predominantly receives signals and is designated as a "receiver". Despite the designations, both "transmitter" 102 and "receiver" 106 may include a transmit section 110 and a receive section 112 and may transmit and receive data.

The transmitter 100 and receiver 102 may be implemented in a wireless local Area Network (WLAN) that complies with the IEEE 802.11 standards (including IEEE 802.11, 802.11a, 802.11b, 802.11g, and 802.11n, 802.16, and 802.20). The IEEE 802.11 standards describe orthogonal frequency-division multiplexing (OFDM) systems and the protocols used by such systems. In an OFDM system, a data stream is split into multiple substreams, each of which is sent over a different subcarrier frequency (also referred to as a "tone"). For example, in IEEE 802.11a systems, OFDM symbols include 64 tones (with 48 active data tones) indexed as $\{-32, -31, \ldots, -1, 0, 1, \ldots, 30, 31\}$, where 0 is the DC tone index. The DC tone is not used to transmit information.

The antennas in the transmitter 102 and receiver 106 communicate over channels in a wireless medium. In FIG. 1, H is the channel response matrix and represents the reflections and multi-paths in the wireless medium, which may affect the quality of the channels. The system may perform channel estimation using known training sequences which are transmitted periodically (e.g., at the start of each frame). A training sequence may include one or more pilot symbols, i.e., OFDM symbols including only pilot information (which is known a priori at the receiver) on the tones. The pilot symbol(s) are inserted in front of each transmitted frame. The receiver 106 uses the known values to estimate the medium characteristics on each of the frequency tones used for data transmission. For example, on the receiver side, the signal $y_i$ for tone i can be written as, $$y_i = H_i x_i + z_i, \quad (1)$$

where $H_i$ is the channel response for the i-th tone, $x_i$ is the symbol transmitted on the i-th tone, and $z_i$ is the additive noise. The receiver may estimate the transmitted signal $x_i$ for the i-th tone from the received signal $y_i$ and the channel response $H_i$. For an IEEE 802.11a OFDM system, the channel response $H_i$ may be a scalar value provided by the channel estimation module, whereas in an M×N MIMO-OFDM system, the channel response $H_i$ may be an M×N matrix.

The number of independent data streams transmitted by the transmit antennas 104 is called the "multiplexing order" or "spatial multiplexing rate" ($r_S$). A spatial multiplexing rate of $r_S=1$ indicates pure diversity, and a spatial multiplexing rate of $r_S$=min ($M_R$, $M_T$) (minimum number of receive or transmit antennas) indicates pure multiplexing.

In an embodiment, the MIMO system 100 may use combinations of diversity and spatial multiplexing, e.g., $1 \leq r_S \leq \min(M_R, M_T)$. For example, in a 4×4 MIMO system, the system may select one of four available multiplexing rates ($r_S \in [1, 2, 3, 4]$) depending on the channel conditions. The system may change the spatial multiplexing rate as channel conditions change.

Figure 2:
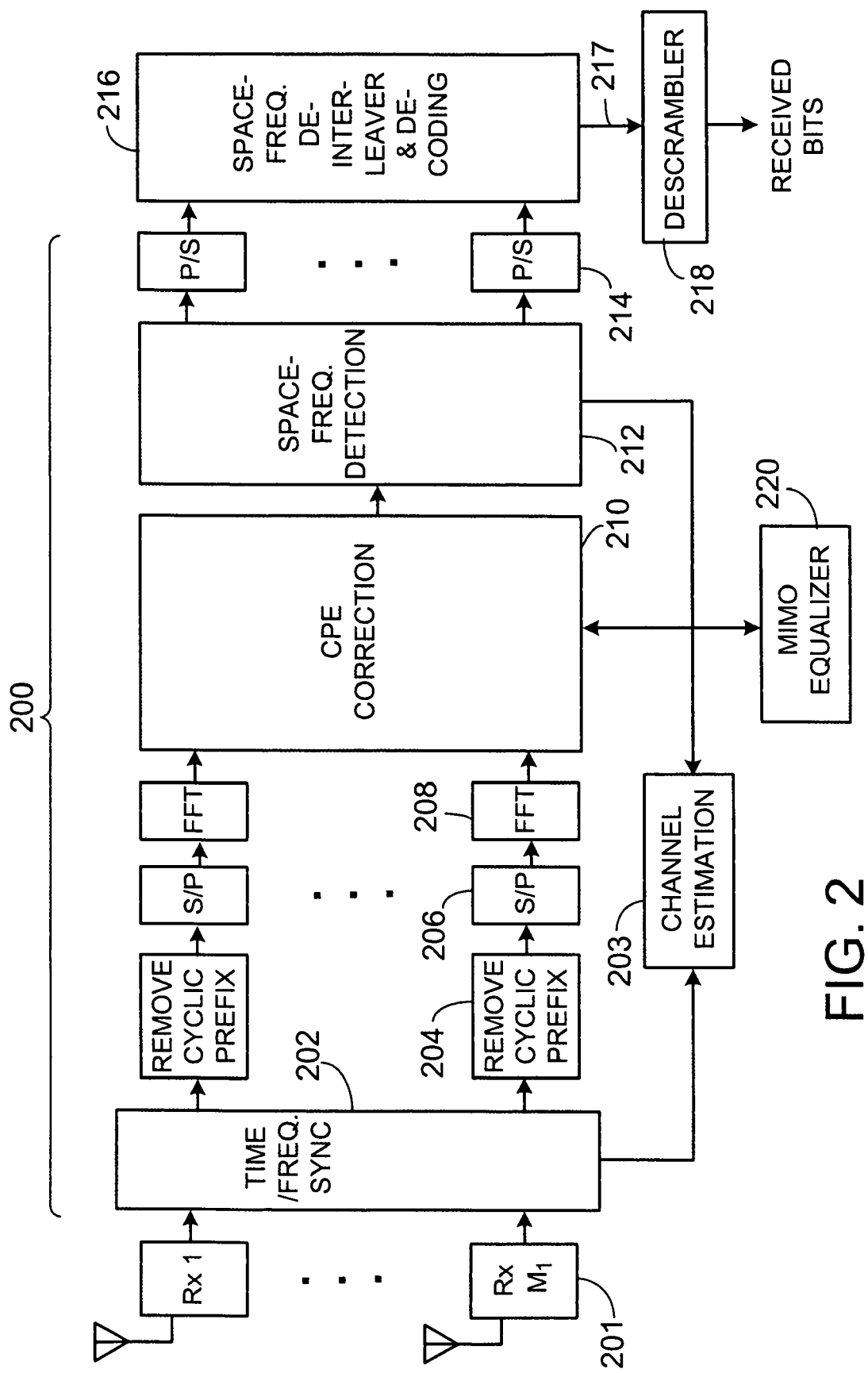
FIG. 2 is a block diagram of a receive section in a transceiver in the MIMO-OFDM communication system.

FIG. 2 shows a block diagram of the receive section 112. The receive section 112 includes stages similar to those in the receive section of an IEEE 802.11a receiver, but with some modifications to account for the multiple receive antennas.

Signals received on the multiple receive antennas are input to corresponding processing chains 200. Each processing chain includes a radio-frequency (RF) module 201 for RF-to-baseband and analog-to-digital (A/D) conversion. The receiver may have a common automatic gain control (AGC) for all antennas to provide minimal gain across all the receive antennas. A time/frequency synchronization module 202 performs synchronization operations and extracts information from the multiple substreams (for $r_S>1$) for channel estimation 203. Each processing chain 200 includes a cyclic prefix removal module 204, a serial-to-parallel (S/P) converter 206, a fast Fourier transform (FFT) module 208, a common phase error (CPE) correction module 210, a space-frequency detection module 212, and a parallel-to-serial (P/S) converter 214. The multiple substreams are input to a space-frequency deinterleaver and decoding module 216 which de-interleaves the substreams into a single data stream and performs soft Viterbi decoding. The single stream is then input to a descrambler 218.

The MIMO-OFDM system may be compatible with IEEE 802.11a systems, and consequently may have many similarities to an IEEE 802.11a system. For example, like IEEE 802.11a systems, the MIMO-OFDM system may use 52 tones (48 data tones and 4 pilot tones), 312.5 kHz subcarrier spacing, an FFT/inverse FFT (IFFT) period of 3.2 μs, a cyclic prefix with a duration of 0.8 μs, and an OFDM symbol duration of 4.0 μs.

Compared to a receiver in an IEEE 802.11a system, which may only have one receive chain, the complexity of most components in the receive chains 200 may scale linearly with the number of antennas. The complexity of the space-frequency detection module 212, however, may not scale linearly because the space-frequency detection module must estimate the signal for each of the forty-eight OFDM subcarriers.

The receiver may use the channel response matrix H to generate a zero-forcing equalizer matrix, $W_{ZF}$, where $$W_{ZF}=(H^* \cdot H)^{-1} H^* = H^\perp. \quad (2)$$

For each subcarrier, the receiver may "invert" the channel to estimate the transmitted signal $\hat{x}$:

$$\hat{x}=(H^* \cdot H)^{-1} \cdot H^* \cdot y = H^\perp \cdot y. \quad (3)$$

The space-frequency detection module may also compute the signal-to-noise ratio (SNR) per substream k:

$$RxSNR_k = \frac{1}{\langle [H*H]^{-1} \rangle_{kk}}, \quad (4)$$

and multiply this value by the estimated transmitted signal vector $\hat{x}$.

In an embodiment, these computations may be performed using an orthogonal matrix triangularization (or "QR decomposition") of the $M_R \times M_T$ channel response matrix H, such that $$H=Q \cdot R, \quad (5)$$

where Q is an ($M_R$, $M_R$) orthogonal matrix, and R is an ($M_R$, $M_T$) upper triangular matrix. The transmitted QAM (Quadrature Amplitude Modulation) vector can then be computed as:

$$x=R^{-1} \cdot Q^* \cdot y = R^{-1} \cdot z. \quad (6)$$

Figure 3:
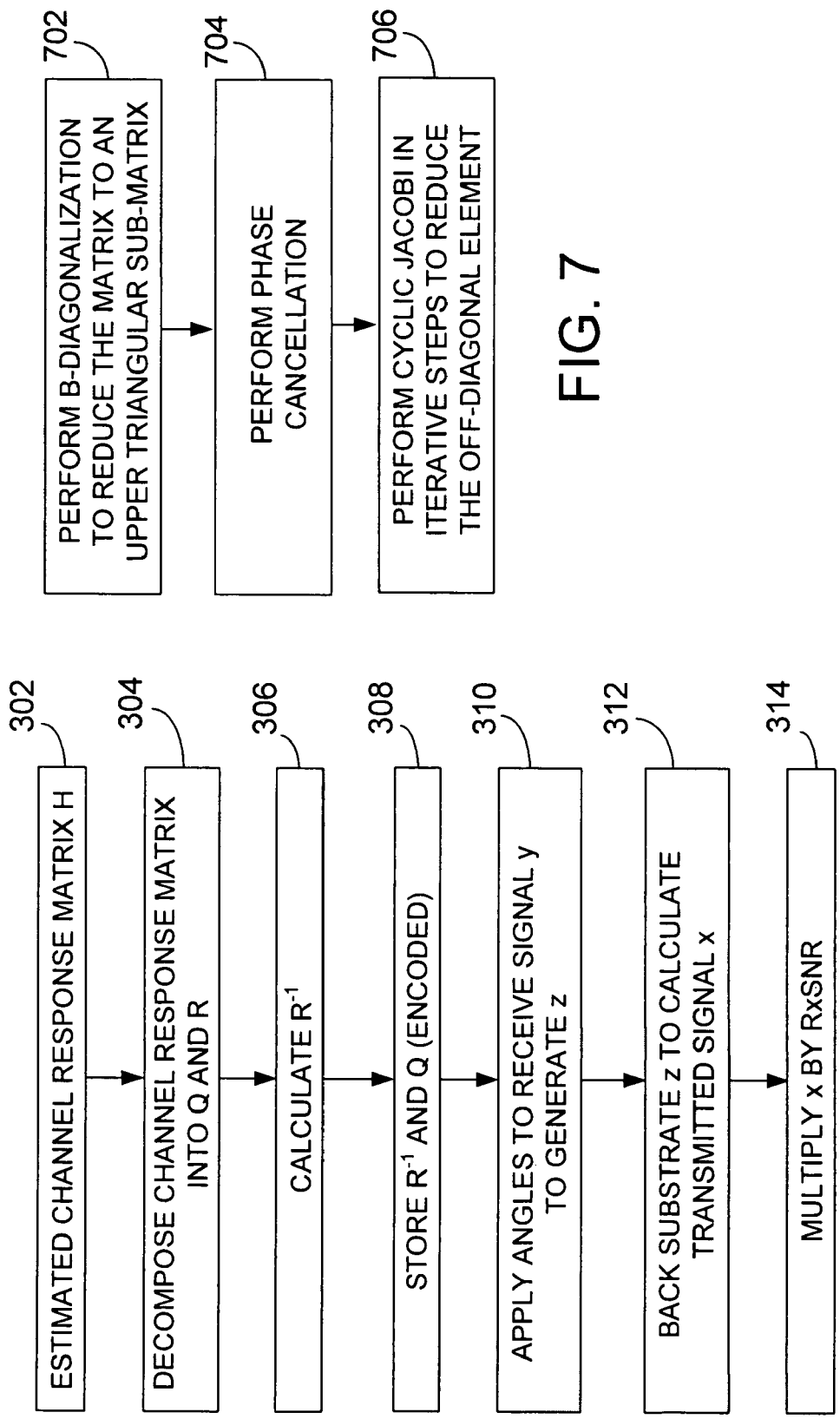
FIG. 3 is a flowchart describing a QR decomposition and decoding operation according to an embodiment.
Figure 4:
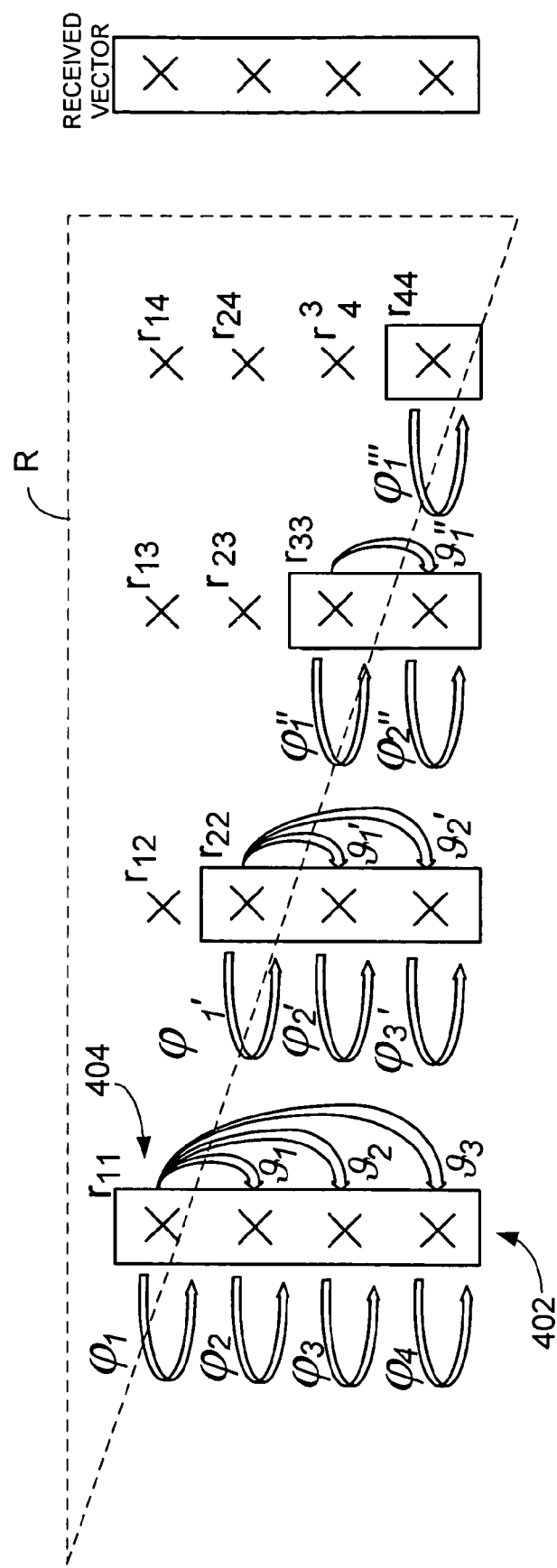
FIG. 4 illustrates Givens rotations operations on a 4×4 channel response matrix.

FIG. 3 shows a flowchart describing a QR decomposition and decoding process according to an embodiment. The channel estimation module 203 may estimate the channel response matrix H column-by-column during initial preprocessing of a packet using training information in the preamble of the packet (block 302). Givens rotations may be used to clear (zero) elements of the matrix one element at a time to generate the Q and R matrices (block 304). The space-frequency module must perform the QR decomposition column-by-column, as they are received from the channel estimation module 203. Elements in a column may be subject to two rotations, one for phase cancellation and another to zero the elements below the diagonal matrix, as shown in FIG. 4. For example, the complex elements in the first column 402 may be rotated by angles $\phi_1$, $\phi_2$, $\phi_3$, $\phi_4$ to remove the imaginary parts of the vectors (phase cancellation), and then rotated by angles $\partial_1$, $\partial_2$, $\partial_9$ to zero the elements below $r_{11}$ 404 in the upper diagonal matrix R. This process may be repeated for the following columns to phase cancel and zero the elements below $r_{ii}$, resulting in diagonal matrix R. During this initial processing, the inverse matrix $R^{-1}$ 500 may be calculated, as shown in FIG. 5 (block 306). The inverse matrix $R^{-1}$ and the angles encoding Q may be stored (block 308). The channel matrix may be assumed to be constant for the entire packet, and the stored values for Q and $R^{-1}$ may be used for decoding symbols in the packet.

After the initial processing for the packet, symbol decoding may be performed for a received vector y by reading Q and applying rotations to the elements in y to calculate z (block 310), which is given by:

$$z=Q^* \cdot y. \quad (7)$$

This value may be back-substituted into Equation 5 to estimate the transmitted signal:

$$\hat{x}=R^{-1} \cdot z. \quad (8)$$

The signal-to-noise ration per transmit stream is given by the reciprocal of the sum of squares of each of the rows of each of the triangular sub-matrices, as shown in FIG. 5. The calculated SNR may be multiplied by the vector $\hat{x}$, and it will be fed into the Viterbi block.

In an embodiment, the Givens rotations may be implemented using a CORDIC (COordiate Rotation Digital Computer) approach. CORDIC is an iterative algorithm for calculating trigonometric functions including sine, cosine, magnitude and phase. A CORDIC module rotates the phase of a complex number by multiplying it by a succession of constant values. However, the "multiplies" can all be powers of 2, so in binary arithmetic they can be performed using just shift and add operations, which may make CORDIC particularly suited to hardware implementations.

Figure 6:
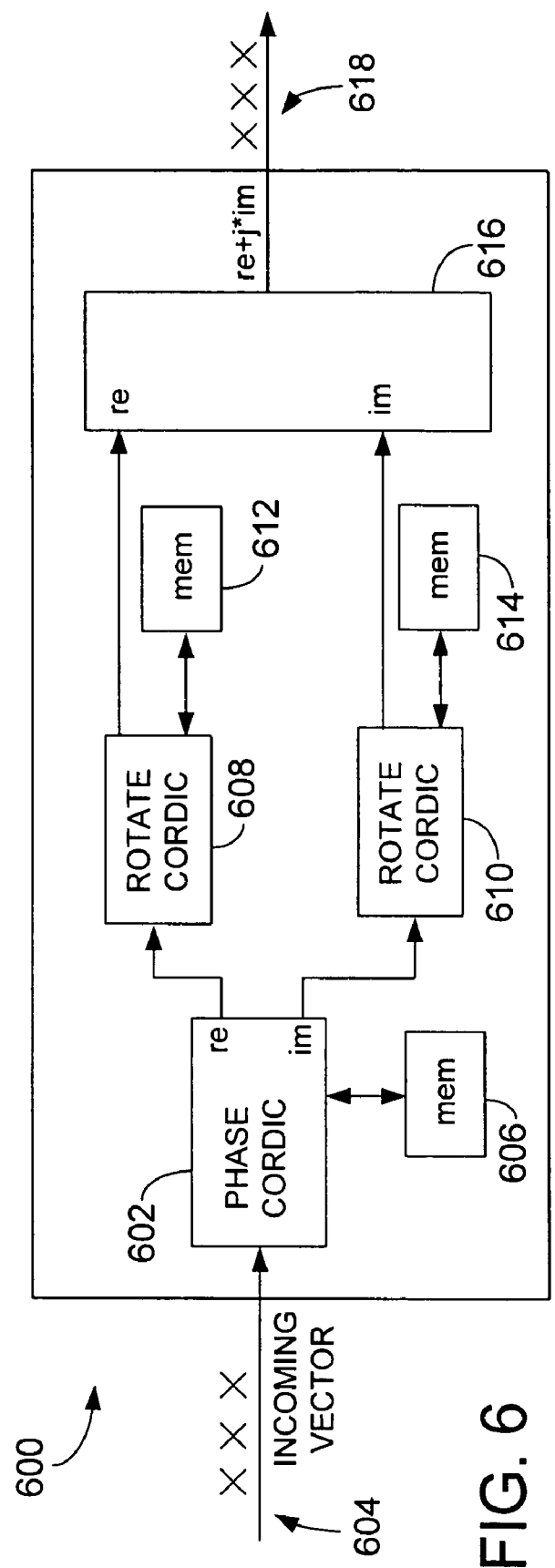
FIG. 6 is a block diagram of a coordinate rotation digital computer (CORDIC) module.

FIG. 6 is a block diagram of a Super-CORDIC module 600, which consists of three CORDIC modules, according to an embodiment. The receiver may include a number of such Super-CORDIC modules, each handling a subset of the subcarrier estimation operations. The CORDIC module 600 may decompose the QR computation into elementary operations. A phase CORDIC 602 may perform a phase canceling operation on an incoming vector 604. The results may be stored in memory 606 and passed to two rotate-CORDICs 608, 610 (for the real and imaginary parts, respectively). The rotate CORDICs may be used to perform the rotations used to zero elements below the upper diagonal matrix. The resulting angles may be stored in memories 612 (real) and 614 (imaginary). These values may be combined in module 616 to generated the transformed vector 618. The values stored in memories 606, 612, and 614 may be used to encode matrix Q and for performing rotations on the received signals (y).

In an embodiment, it may be desirable for the receiver to perform singular value decomposition (SVD) algorithms, e.g., in systems which utilize feedback to optimize energy distribution on the transmit channels. In an embodiment, the Super-CORDIC module may be modified to handle both Givens rotations and SVD calculations. The SVD-CORDIC module may be used to perform both the Givens rotations and SVD operations, thereby conserving resources and chip area.

FIG. 7 is a flowchart describing an SVD-CORDIC operation 700. The SVD algorithm may be performed in a manner similar to that used for the Givens rotations. Much of the same CORDIC hardware may be re-used for matrix manipulation in the SVD calculations. FIGS. 8A-C show exemplary steps in an SVD calculation for a 2×3 matrix. First a bi-diagonalization operation may be performed to reduce the matrix to an upper triangular sub-matrix (block 702), as shown in FIG. 8A. To deal with the complex value $e^{j\Phi}$, a phase cancellation operation may be performed (block 704), as shown in FIG. 8B. Next a cyclic Jacobi operation may be performed, including several sweeps, in which σ is a small number. A number of iterative steps may be performed to reduce the off-diagonal element until it is very small (ϵ) (block 706), as shown in FIG. 8C.

A number of embodiments have been described. Nevertheless, it will be understood that various modifications may be made without departing from the spirit and scope of the invention. For example, blocks in the flowchart may be skipped or performed out of order and still produce desirable results. Accordingly, other embodiments are within the scope of the following claims.

The invention claimed is:

1. A method comprising:
receiving a channel response matrix;
performing a QR decomposition of the channel response matrix using Givens rotations, wherein performing the QR decomposition comprises performing a plurality of rotations using a plurality of angles on at least a portion of the channel response matrix, the plurality of rotations including two rotations, (1) for phase cancellation to remove imagery parts of vectors and (2) to zero matrix elements that are below a diagonal matrix by rotating angles to zero the elements in the diagonal matrix;
producing an upper triangular matrix R based on a result of the performed plurality of rotations;
calculating an inverse of the R matrix from the matrix R;
receiving a plurality of signals in a receiver; and
estimating a plurality of transmitted signals from information comprising the inverse of the R matrix, the plurality of angles, and the plurality of received signals.

2. The method of claim 1, further comprising:
calculating a signal-to-noise ratio from the inverse of the R matrix.

3. The method of claim 1, further comprising:
performing the Givens rotations using a coordinate rotation digital computer (CORDIC) module.

4. The method of claim 3, further comprising:
performing a singular value decomposition (SVD) operation using the CORDIC module.

5. The method of claim 1, wherein said receiving the plurality of signals comprises receiving a plurality of symbols in an orthogonal frequency-division multiplexing (OFDM) packet.

6. The method of claim 1, wherein said receiving the channel response matrix comprises receiving a channel response matrix for a MIMO-OFDM channel.

7. An apparatus comprising:
a QR decomposition module that performs a QR decomposition on a received channel response matrix using Givens rotations, wherein the QR decomposition module performs a plurality of rotations using a plurality of angles on at least a portion of the channel response matrix, the plurality of rotations including two rotations, (1) for phase cancellation to remove imagery parts of vectors and (2) to zero matrix elements that are below a diagonal matrix by rotating angles to zero the elements in the diagonal matrix, and produces an upper triangular matrix R based on a result of the performed plurality of rotations, wherein the QR decomposition module further calculates an inverse of the R matrix from the matrix R;
a memory that stores the inverse of the R matrix and the plurality of angles; and
a decode module that estimates a plurality of transmitted signals from information comprising the inverse of the R matrix, the plurality of angles, and a plurality of received signals.

8. The apparatus of claim 7, wherein the QR decomposition module calculates a signal-to-noise ratio from the inverse of the R matrix.

9. The apparatus of claim 7, wherein the QR decomposition module and the decoder module comprise one or more coordinate rotation digital computer (CORDIC) modules that perform Givens rotations and decoding of received signals.

10. The apparatus of claim 9, wherein the CORDIC module performs a singular value decomposition (SVD).

11. The apparatus of claim 7, wherein the plurality of received signals comprise a plurality of symbols in an orthogonal frequency-division multiplexing (OFDM) packet.

12. The apparatus of claim 7, wherein the channel response matrix comprises a channel response matrix for a MIMO-OFDM channel.

13. An apparatus comprising:
means for performing a QR decomposition on a received channel response matrix using Givens rotations, wherein the means for performing the QR decomposition comprises means for performing a plurality of rotations using a plurality of angles on at least a portion of the channel response matrix, the plurality of rotations including two rotations, (1) for phase cancellation to remove imagery parts of vectors and (2) to zero matrix elements that are below a diagonal matrix by rotating angles to zero the elements in the diagonal matrix;
means for producing an upper triangular matrix R based on a result of the performed plurality of rotations;
means for calculating an inverse of the R matrix from the matrix R;
means for storing the plurality of angles and the inverse of the R matrix; and means for estimating a plurality of transmitted signals information comprising the inverse of the R matrix, the plurality of angles, and a plurality of received signals.

14. The apparatus of claim 13, further comprising means for calculating a signal-to-noise ratio from the inverse of the R matrix.

15. The apparatus of claim 13, further comprising means for performing Givens rotations and decoding received signals using coordinate rotation digital computer (CORDIC) methods.

16. The apparatus of claim 15, further comprising means for performing a singular value decomposition (SVD).

17. The apparatus of claim 13, wherein the plurality of received signals comprise a plurality of symbols in an orthogonal frequency-division multiplexing (OFDM) packet.

18. The apparatus of claim 13 wherein the channel response matrix comprises a channel response matrix for a MIMO-OFDM channel.

19. A system comprising:
a plurality of antennas that receive signals; and
a receive section that processes the received signals from the plurality of antennas, the receive section including:
a channel estimation module that estimates a channel response matrix from the received signals;
a QR decomposition module that performs a QR decomposition on the channel response matrix using Givens rotations, wherein the QR decomposition module performs a plurality of rotations using a plurality of angles on at least a portion of the channel response matrix, the plurality of rotations including two rotations, (1) for phase cancellation to remove imagery parts of vectors and (2) to zero matrix elements that are below a diagonal matrix by rotating angles to zero the elements in the diagonal matrix, and produces an upper triangular matrix R based on a result of the performed plurality of rotations, wherein the QR decomposition module calculates an inverse of the R matrix from the matrix R;
a memory that stores the inverse of the R matrix and the plurality of angles; and
a decode module that estimates a plurality of transmitted signals from information comprising the inverse of the R matrix, the plurality of angles, and the plurality of received signals.

20. The system of claim 19, wherein the QR decomposition module calculates a signal-to-noise ratio from the inverse of the R matrix.

21. The system of claim 19, wherein the QR decomposition module and the decoder module comprise one or more coordinate rotation digital computer (CORDIC) modules that perform Givens rotations and decoding of received signals.

22. The system of claim 21, wherein the CORDIC module performs a singular value decomposition (SVD).

23. The system of claim 19, wherein the plurality of received signals comprise a plurality of symbols in an orthogonal frequency-division multiplexing (OFDM) packet.

24. The system of claim 19, wherein the channel response matrix comprises a channel response matrix for a MIMO-OFDM channel.

25. A system comprising:
a plurality of antenna means for receiving signals;
means for processing the received signals from the plurality of antenna means;
means for estimating a channel response matrix from the received signals;
means for performing a QR decomposition on the channel response matrix using Givens rotations, wherein the means for performing the QR decomposition comprises means for performing a plurality of rotations using a plurality of angles on at least a portion of the channel response matrix, the plurality of rotations including two rotations, (1) for phase cancellation to remove imagery parts of vectors and (2) to zero matrix elements that are below a diagonal matrix by rotating angles to zero the elements in the diagonal matrix;
means for producing an upper triangular matrix R based on a result of the performed plurality of rotations;
means for calculating an inverse of the R matrix from the matrix R;
means for storing the plurality of angles and the inverse of the R matrix; and
means for estimating a plurality of transmitted signals from information comprising the inverse of the R matrix, the plurality of angles, and a plurality of received signals.

26. The system of claim 25, further comprising means for calculating a signal-to-noise ratio from the inverse of the R matrix.

27. The system of claim 25, further comprising means for performing Givens rotations and decoding received signals using coordinate rotation digital computer (CORDIC) methods.

28. The system of claim 27, further comprising means for performing a singular value decomposition (SVD).

29. The system of claim 25, wherein the plurality of received signals comprise a plurality of symbols in an orthogonal frequency-division multiplexing (OFDM) packet.

30. The system of claim 25, wherein the channel response matrix comprises a channel response matrix for a MIMO-OFDM channel.

31. The method of claim 1, wherein estimating the plurality of transmitted signals comprises applying rotations to the plurality of received signals using the plurality of angles.

32. The method of claim 31, wherein estimating the plurality of transmitted signals comprises applying the inverse of the R matrix to an output of the applying rotations to the plurality of received signals.

33. The method of claim 1, further comprising:
storing the inverse of the R matrix; and
storing the plurality of angles encoding a Q matrix of the QR decomposition.

34. The system of claim 25, wherein means for estimating a plurality of transmitted signals comprises, means for applying rotations to the plurality of received signals using the plurality of angles.

35. The system of claim 34, wherein means for estimating a plurality of transmitted signals comprises means for applying the inverse of the R matrix to an output of the means for applying rotations to the plurality of received signals.

* * * * *